United States Patent [19]

Kim

[11] Patent Number: 4,827,903

[45] Date of Patent: May 9, 1989

[54] BARBECUE COOKER WITH SMOKE AND COLLECTION SYSTEM

[76] Inventor: Byung N. Kim, 939 S. Westmoreland Ave. #207, Los Angeles, Calif. 90006

[21] Appl. No.: 80,170

[22] Filed: Jul. 29, 1987

Related U.S. Application Data

[63] Continuation of Ser. No. 793,244, Oct. 31, 1985, abandoned.

[51] Int. Cl.⁴ ............................................. F24C 15/20
[52] U.S. Cl. ........................... 126/299 R; 126/299 D; 126/41 R; 126/300; 126/39 R
[58] Field of Search ........................ 126/300, 36, 25 R

[56] References Cited

U.S. PATENT DOCUMENTS

| | | | |
|---|---|---|---|
| 731,985 | 6/1903 | Warren | 126/300 |
| 2,102,893 | 12/1937 | Forster | 126/36 |
| 2,905,077 | 9/1959 | Del Francia | 126/41 |
| 3,500,812 | 3/1970 | Korngold | 126/25 R |
| 3,587,555 | 6/1971 | Cerola | 126/300 X |
| 3,613,657 | 10/1971 | Wilska et al. | 126/41 R |
| 3,712,819 | 1/1973 | Field | 126/300 X |
| 3,834,135 | 9/1974 | Jordan | 126/299 D |
| 4,034,663 | 7/1977 | Jenn et al. | 99/446 |
| 4,291,668 | 9/1981 | Moeller | 126/41 R |
| 4,335,705 | 6/1982 | Kurotaki | 126/299 R |
| 4,413,610 | 11/1983 | Berlik | 126/39 R X |
| 4,562,827 | 1/1986 | Cerola | 126/299 R |
| 4,582,046 | 4/1986 | Yamada | 126/41 R |
| 4,603,684 | 8/1986 | Kazue et al. | 126/300 X |

Primary Examiner—Samuel Scott
Assistant Examiner—Carl D. Price
Attorney, Agent, or Firm—Lyon & Lyon

[57] ABSTRACT

A table-mounted barbecue cooker is provided which has a grill, gas burner or coals, grease pan, smoke collection system and greaase collection system including a grease filter. The grill, burner or coal box, and grease pan are all easily removed for cleaning through the top of the barbecue cooker and the filter from underneath. The burner is so located as to prevent flames from reaching grease collection areas. Coals or charcoals may be used in place of a gas burner depending on the local fuel supply and for flavoring and appearance.

14 Claims, 3 Drawing Sheets

FIG_1

BARBECUE COOKER WITH SMOKE AND COLLECTION SYSTEM

This is a continuation of co-pending application Ser. No. 793,244, filed on Oct. 31, 1985, now abandoned.

BACKGROUND OF THE INVENTION

The field of this invention is that of barbecue cookers or roasters which cook or roast such foods as meats, sea foods, vegetables, and the like on a grate or grill, the heat source being applied from underneath the grate or grill. More particularly, the present invention pertains to the field of cookers or roasters which can be mounted in the top of a table as in a restaurant or household.

Such cookers or roasters can generate large quantities of smoke and grease, particularly when meats are being barbecued. For sanitary, safety, and aesthetic reasons, smoke produced by the barbecue or roaster should be properly disposed of rather than allowing it to permeate into the ambient air, particularly when the barbecue is mounted indoors in a restaurant or household. Overhead collection means to collect and dispose of the smoke after it has risen from the barbecue cooker or stove are well known in the prior art. U.S. Pat. No. 731,985 to Warren shows a smoke collecting hood for stoves which is hung over the stove to catch and trap smoke rising therefrom. However, because the smoke must rise vertically from the stove to the overhead hood, smoke may permeate the surrounding atmosphere rather than rise into the hood. Such overhead smoke collection means are not very efficient and require an additional unit to be supplied with the stove when the stove is mounted in the top of a table or counter.

Smoke collection means which are part of the stove and draw off the smoke in a different direction than from overhead are known to the prior art. For example, U.S. Pat. No. 4,034,663 to Jenn et al. discloses a ventilated portable electric grill which has an adjoining upwardly extending portion housing a power driven fan which draws air, smoke, and cooking vapors across the grill element and into the upwardly extending portion. The fan outlet discharges to the exterior of the stove at which point a pipe or tube can be provided to direct the smoke out of the room to the exterior of the house or restaurant. Such an assembly is not well adapted to fit into a table flush with the surface thereof because of the upwardly extending portion containing the fan. Furthermore, Jenn et al. did not disclose a grill assembly adapted to be used with gas burners.

U.S. Pat. No. 4,291,668 to Moeller discloses a griddle ventilating system which provides collection inlets formed in walled members spaced around the grill in order to draw the smoke away from the grill. A receiving chamber having a filter receives the smoke from the wall members and conducts it away from the grill. This ventilating system draws smoke to the sides away from the grill rather than allowing it to rise straight up as in Warren.

However, the ventilating system of Moeller is not well adapted for use in tabletop barbecues or grills which should be mounted flush with the top of the table. In addition, the smoke must make several right angle turns in passing through the wall members mounted around the grill in order to reach the filter. In the course of its travel to the filter, grease particles entrained in the smoke may be deposited in the smoke passages and create a fire hazard. The collection inlets and smoke passages are not easily cleaned because of the difficulty of the disassembly of the wall members.

U.S. Pat. No. 4,335,705 to Kurotaki discloses a smoke collecting and exhausting system for a roaster which is mounted in and flush with the top of a table. A grill is set in a recess in the roaster upon which meats are roasted. Flame is provided by two gas burners. A smoke ventilation system draws smoke to the sides of the grill, around and underneath the grill and a juice receiver, down through a duct to a right angled bend in the duct underneath the floor, through a filter removably mounted in the duct, and thence on outward to a smoke exhaust means such as a chimney.

Although Kurotaki provides a tabletop roaster designed for interior use, as in a restaurant, the roaster so provided has a number of problems. First, two burners are provided which requires more complicated gas supply, ignition, and ventilation systems than that of a single burner, and a greater fuel consumption than a single burner would use. Second, the two burners are mounted at the sides of the inner roaster body so that flames may rise up and curl over the sides of the inner roaster body and then down into the smoke collection passages, owing to the suction of the ventilation system. This may set fire to grease accumulations inside the roaster and heat the sides of the roaster to a dangerously high temperature. Third, the parts of the roaster are not easily removable for cleaning. Thus, grease may collect in hard to reach places and present a fire hazard. Fourth, the filter is located at some distance from the roaster and the smoke has to pass through several turns in order to reach it. This will cause grease particles entrained in the smoke to deposit in curved portions and ledges of the roaster and right angled portions of the smoke passages, creating a fire hazard. Fifth, the filter is located at some distance from the roaster, which is inconvenient as well as dangerous in that the smoke is not filtered soon after it is generated, thus increasing likelihood of grease deposition. For all the above reasons, the Kurotaki roaster cannot pass basic sanitary and safety standards in order to permit its use in this country in commercial establishments and in households. In particular, the Kurotaki roaster would not comply with the American Gas Association's American National Standards Z83.14 and Z83.14a-1983 which cover gas counter appliances. In addition, the Kurotaki roaster does not appear to be well adapted to receive and heat water for steaming vegetables and the like, and must draw air from above it for combustion which interferes with effective smoke collection.

Accordingly, what is needed is a safe, easily cleaned, smokeless, efficient, tabletop barbecue cooker able to meet national standards for such appliances in commercial establishments and households and capable of cooking a variety of foods. Such a cooker should also be capable for being manufactured for use with various heating means.

SUMMARY OF THE INVENTION

An object of the present invention is to provide a smoke collection system for a barbecue cooker which will effectively collect all of the smoke produced by cooking and not allow it to permeate into the ambient atmosphere around the barbecue or roaster.

Another object of the present invention is to provide a grease collection system for a barbecue cooker to collect the grease produced by cooking, both directly from the drippings and sputterings of meats or other foods and from the smoke caused by cooking.

A further object of the present invention is to provide all grease collection components that may easily be removed from the barbecue cooker for easy and thorough cleaning.

Yet another object of the present invention is to provide smoke filter means in order to remove entrained grease particles from the smoke before the smoke is discharged to the outside of the building in which the barbecue cooker is located.

Still another object of the present invention is to incorporate the filter means as part of the barbecue or roaster for convenient access for cleaning and replacement and to minimize the distance and turns that the smoke goes through before reaching the filter means, in order to minimize grease buildup on interior surfaces of the barbecue cooker and associated smoke exhaust ducts or piping.

Thus, an object of the present invention is to provide a barbecue cooker that is easily cleaned, lacking in hard-to-reach locations that would trap grease and incapable of drawing flame down smoke ventilation passages, thus preventing fire hazards.

Accordingly, an object of the present invention is to provide a barbecue cooker that is safe and meets the standard for such appliances set by the industry and by government.

A further object of the present invention is to provide a compact, light, and efficient barbecue cooker capable of cooking, roasting or steaming a variety of foods, that may be mounted in a table flush with the tabletop.

Yet another object of the present invention is to provide a barbecue cooker which may be directly and easily controlled by the persons using it, such as restaurant customers or private owners.

Yet a further object of the present invention to provide an efficient barbecue cooker which is economical in the use of fuel, and which is adaptable to the use of different types of fuel, such as gas or charcoal.

In accordance with the invention a barbecue cooker that may be set into the top of a table is provided with a removable grill and greasepan assembly which is removably set into the top of a cooker body. Smoke collection passages gather and channel all smoke, produced by cooking, around and down the sides of the greasepan to a filter underneath which removes grease particles entrained in the smoke. Burner means are aligned under the grill safely distant from the sides of the greasepan and are provided with air passing through passages penetrating the side of the cooker body. All surfaces inside the cooker which collect grease can be removed for washing or are easily accessible for hand-cleaning. In addition, all side and bottom interior surfaces of the cooker body exposed to unfiltered smoke have vertical or inclined surfaces to prevent hazardous accumulations of grease.

In a first preferred embodiment of the present invention, the burner means consists of a gas burner with associated pilot light and gas supply mechanisms. In a second preferred embodiment, the burner means consists of charcoal and the like, placed in a coal pan which replaces the grease pan.

BRIEF DESCRIPTION OF THE DRAWINGS

The above and other objects and features of the invention will become apparent from the description of the preferred embodiment, taken with reference to the accompanying drawings, in which:

FIG. 4 is an enlarged top plan view of the assembly of the first preferred embodiment of the present invention with the barbecue cooker cover removed and portions of the grill and greasepan removed to show the burner; and FIG. 5 is a side cross-sectional view of a second preferred embodiment of the assembly of the present invention adapted for use with charcoal and the like.

DETAILED DESCRIPTION OF THE PREFERRED EMBODIMENT

Figure 1:
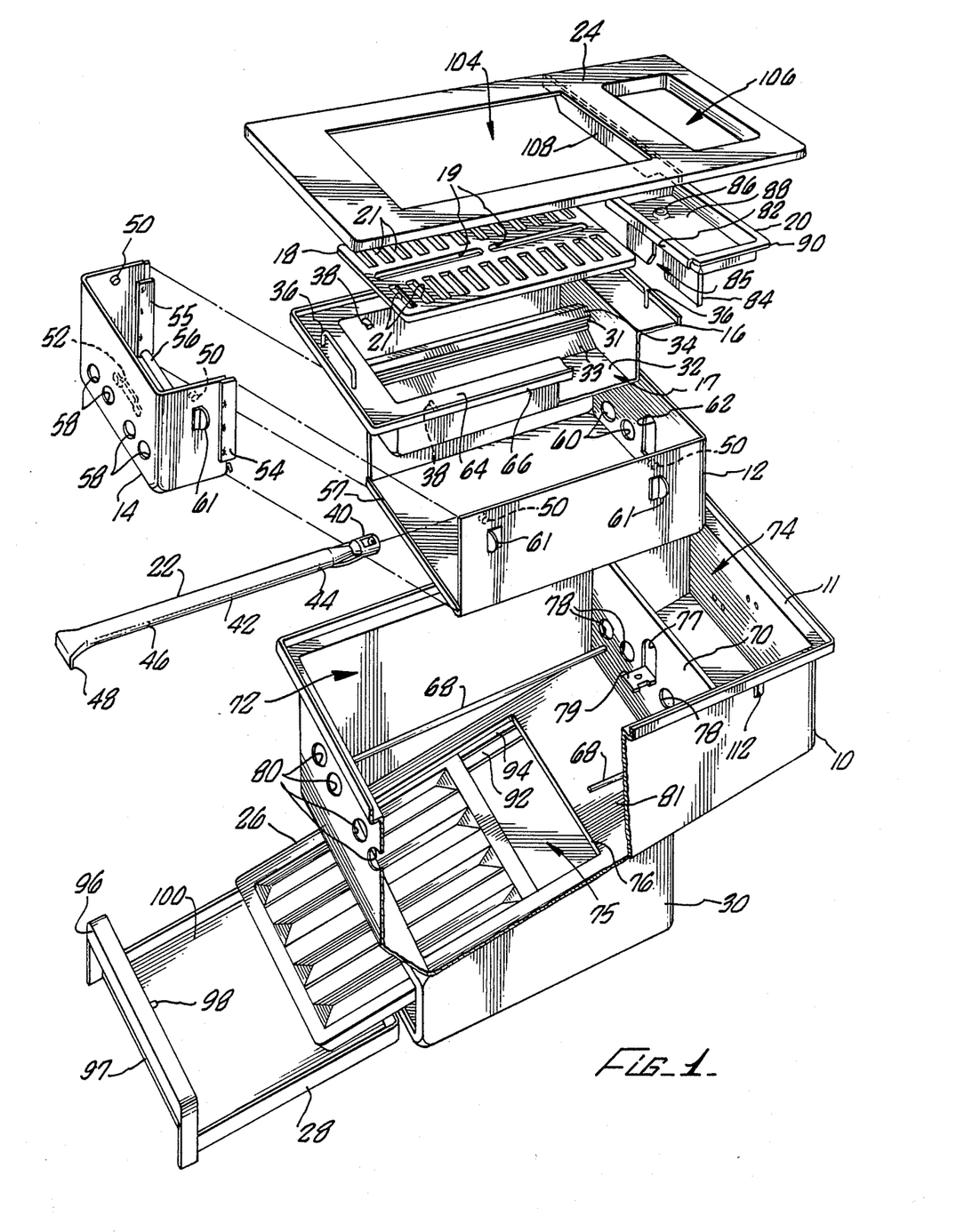
FIG. 1 illustrates a perspective exploded view of the assembly embodying a first preferred embodiment of the present invention, minus the cooker housing and fuel supply and pilot light mechanisms.

FIG. 1 shows a perspective exploded view of a first preferred embodiment of a barbecue cooker according to the present invention, minus gas supply and pilot light mechanisms. The first preferred embodiment is adapted for use with natural gas, propane gas and the like as the fuel for the combustion which cooks the food. All components of the barbecue cooker, except the grill and portions of the gas supply and pilot light mechanisms, are made of stainless steel for durability, corrosion resistance, and ease of cleaning.

Figure 2:
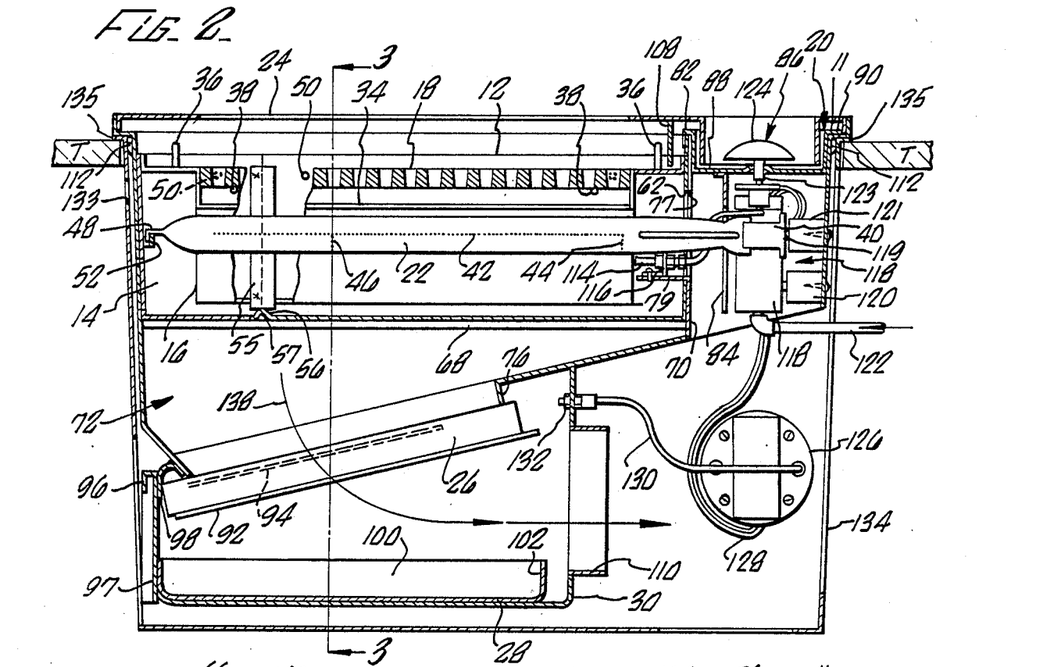
FIG. 2 is an enlarged side cross-sectional view of the assembly of the first preferred embodiment of the present invention, mounted in the cooker housing, with portions of the grill and greasepan removed to show the side of the greasepan support box.
Figure 3:
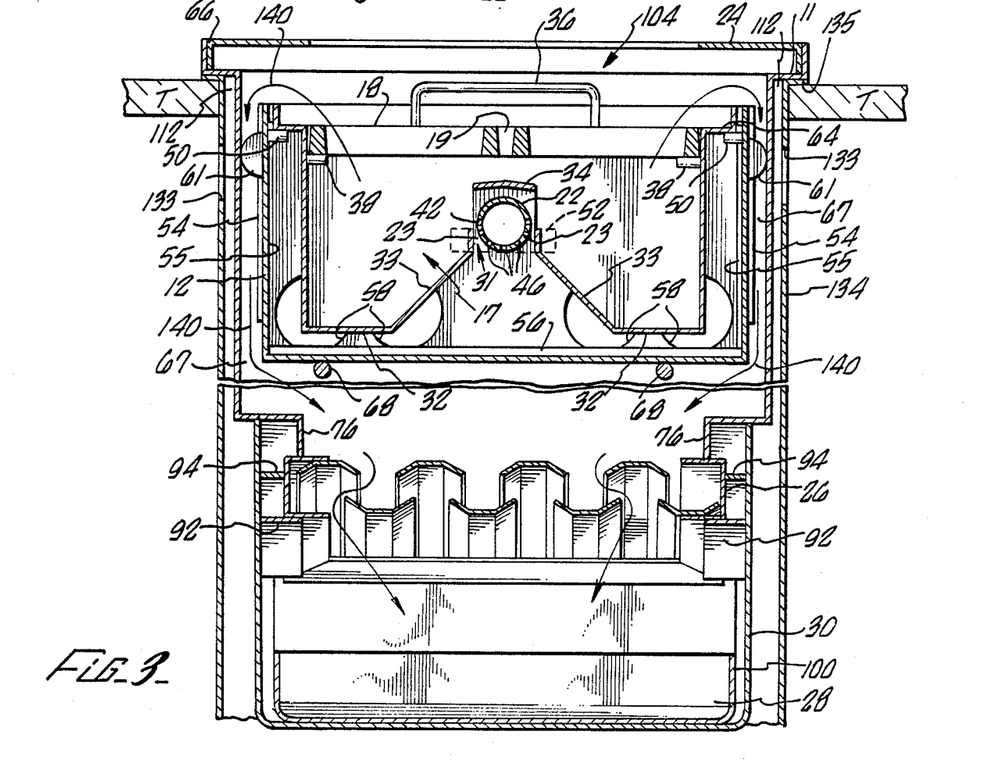
FIG. 3 is an enlarged end cross-sectional view of the assembly of the first preferred embodiment of the present invention taken along line 3—3 of FIG. 2.

Cooker body 10 is rectangular when seen from above. The cooker body defines a large rectangular first space 72 and a smaller rectangular second space 74, separated by dividing wall 70. Underneath first space 72 is a generally rectangular grease tray housing 30, which is an integral part of cooker body 10 and is smaller in width than cooker body 10. Cooker body 10 has a flanged rim 11 adapted to receive cooker cover 24. Underneath flanged rim 11, in the side walls of cooker body 10, are positioning ribs 112 which act to laterally position cooker body 10 within a cooker housing 134 mounted in a table T (cooker housing 134 and table T are shown in FIGS. 2 and 3).

Grill 18 is made of cast iron and is supported in greasepan 16 by grill support pegs 38 so that grill 18 is flush with the top of greasepan 16. Greasepan 16 has two troughs 17, defined by greasepan bottoms 32 and ramps 33. The two troughs 17 are separated by a burner slot 31. Burner cover 34 forms a roof over burner slot 31 and has a inverted V cross-section (but may also have an inverted V-shaped cross-section). Grill 18 contains central grill slots 19, as well as ancillary grill slots 21 perpendicular to central grill slot 19. When the grill 18 is in place, central grill slot 19 is aligned parallel to and spaced over burner cover 34. Grease from cooking meats can then fall through central grill slots 19 onto the heated burner cover 34, thus producing an aromatic smoke which helps flavor the meats cooked. (The smoke is drawn off by the smoke collection system described later.)

The two troughs 17 collect grease that drips or sputters from food being cooked on grill 18. In addition to collecting grease, the troughs may be filled with water in order to steam food placed upon the grill. Small lava rocks may be placed in or on a wire tray disposed horizontally above the burner cover and below the grill (not shown) for the sake of appearance and flavor. Greasepan 16 is equipped with two handles 36 which facilitate its swift removal from the top of the barbecue cooker. The greasepan has a ledge 64 about its top periphery and a greasepan lip 66 at the edge of the greasepan ledge 64. The entire assembly of grill 18 and greasepan 16 can be lifted out together by handles 36.

Greasepan 16 is supported by the combination of first greasepan support box segment 12 and second greasepan support box segment 14. Together these segments form an open-top box in which greasepan 16 rests and is supported by greasepan support pegs 50 located upon inner walls of the greasepan support box segments 12 and 14 which press up against greasepan ledge 64. The greasepan support box comes in the two segments 12 and 14 in order to facilitate removal of the greasepan support box from cooker body 10. When removing the support box the second support box segment 14 is removed first followed by first, greasepan support box segment 12. When the greasepan support box segments 12 and 14 are joined together to form one open-topped greasepan support box, lateral inner flanges 55 and lateral outer flanges 54 attached to second greasepan support box segment 14 align the side walls of the two support box segments and prevent entry of smoke or grease from the side into the interior of the box formed by the two support box segments 12 and 14. Likewise, the combination of ridge 57 on support box segment 12 and ridge cover 56 on smaller second support box segment 14 prevent entry of smoke or grease from the bottom of space 72 into the interior of the box defined by the two support box segments; likewise, they prevent exit of grease r air from that box into the bottom of space 72. Second support box segment 14 is provided with burner support socket 52 on an inner end wall to support burner 22. First support box segment 12 has a burner opening 62 in its end wall through which the burner 22 passes in order to reach second space 74.

The burner 22 is an elongated stainless steel tube, such as that sold by Lincoln Brass, with one end crimped down to form burner support flange 48. At the other end of burner 22, and integrally formed therewith, is burner gas line connector 40. On either side of the tube of burner 22 is an axially disposed line of small burner gas holes 42 which permit exit of a gas-air mixture for burning to provide the flame that cooks food on grill 18. A small semi-circle of radially aligned holes forms the first set of burner holes 44 near the burner gas line connector 40 and a second semi-circle of radially aligned holes forms the second set of burner holes 46 near burner support flange 48.

Figures 4, 5:
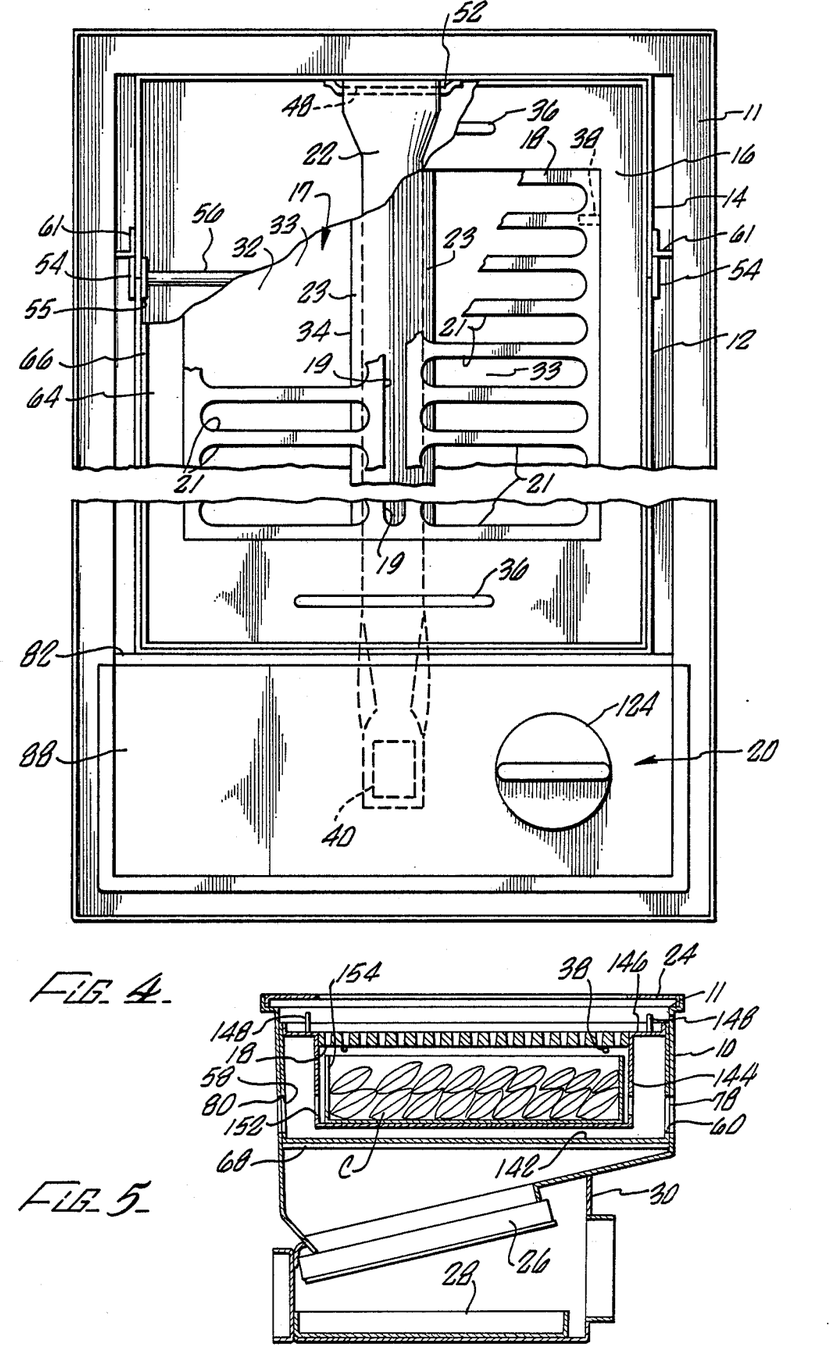

When the barbecue cooker is assembled, first and second support box segments 12 and 14 are united so that lateral outer flanges 54 and lateral inner flanges 55 of the second support box segment 14 overlap the walls of first support box segment 12, and ridge cover 56 on the second support box segment 14 overlaps ridge 57 on first support box segment 12. Together first and second support box segments 12 and 14 form one open top box, which is then placed so that it rests inside cooker body 10 on support rods 68. These support rods 68 run between an end of cooker body 10 and dividing wall 70, parallel to the side walls of the cooker body 10 and parallel to each other. (Although not shown, flanges could be welded into the end walls of space 72 just below support rods 68 to prevent the air which enters the support box segments through the end walls from being drawn down into space 72 below the support box segments.) Spacers 61 on the greasepan support box segments 12 and 14 position the assembled greasepan support fox laterally within the cooker body 10. Two smoke passages 67 are then formed between either side of greasepan support box segments 12 and 14 and cooker body 10. (These smoke passages 67 are best seen in FIGS. 3 and 4.)

When support box segments 12 and 14 are in place in cooker body 10, the tops of the support box segments 12 and 14 are slightly below the upper edge of cooker body 10. Burner 22 is then placed inside support box segments 12 and 14 in such a way that burner support flange 48 engages burner support socket 52 on the second support box segment 14, thus supporting one end of burner 22. When support box segment 12 is in place in cooker body 10 and resting upon support rods 68, burner opening 62 in the end wall of support box segment 12 is aligned with dividing wall burner aperture 77 in dividing wall 70, and ledge 79 protrudes from dividing wall 70 into the first support box segment 12 through burner opening 62. The end of burner 22 containing burner gas line connector 40 passes through burner opening 62 and dividing wall aperture 77. Burner gas line connector 40 is then located in second space 74 where it connects to the gas supply apparatus (to be described in more detail in the description of FIG. 2).

After the two support box segments 12 and 14 are in place in first space 72 of cooker body 10, and burner 22 is in place in the support box segments 12 and 14, greasepan 16 is lowered into the two support box segments 12 and 14 and is supported by them as described earlier. Burner 22 then fits into burner slot 31 of the greasepan 16 with burner gas holes 42 located slightly above the edges of ramps 33 to permit exit of the gas-air mixture that is to be burned. Ventilation slots 23 then exist between burner 22 and the rims of ramps 33 to permit passage of air from underneath the burner. (Ventilation slots 23 are shown in FIG. 3.) Burner cover 34 then covers burner 22 and is spaced above it. The burner cover 34 shields the burner from grease sputterings and drippings from cooking food articles. The burner cover extends far enough laterally to shield the burner 22 from grease drippings but does not interfere with the direction of flame from the burner, which is out sideways from the burner and then upwardly to the grill. Grill 18 then is placed within greasepan 16 where it rests upon grill support pegs 38, as previously described.

When greasepan support box segments 12 and 14 are in place within cooker body 10, their end walls firmly abut, in order to prevent passage of smoke, divider wall 70 and an end wall of cooker body 10 respectively. Ventilation holes 58 in the second greasepan support box segment 14 then coincide with cooker body ventilation holes 80 to permit air to enter the support box segment assembly from the side of the cooker body 10 and thus to reach, and pass around via ventilation slots 23, from underneath the greasepan 16, burner 22 placed in slot 31 of the greasepan. Likewise, ventilation holes 60 in first support box segment 12 coincide with dividing wall ventilation holes 78 to permit air to enter the support box segment assembly laterally from second space 74.

Cover tray 20 rests on top of second space 74 in cooker body 10, being partly supported by cover tray rim 90 which rests on flanged rim 11 of the cooker body 10. Cover tray 20 is also supported by cover tray flange 82 resting on top of dividing wall 70. Cover tray flange 82 overlaps the dividing wall 70 in order to help prohibit the entry of smoke into second space 74. Cover tray 20 has an indented surface that forms cover tray top 88. Cover tray top 88 is penetrated by gas control aperture 86 to permit passage of a gas control valve stem (shown in FIG. 2) for control of the fuel flow into the burner 22. In addition, cover tray 20 has a cover tray burner positioning wall 84 depending from it which is provided with a cover tray burner aperture 85 into which burner 22 fits. Positioning wall 84 positions burner 22, prevents turbulence in the air entering the grease pan support box assembly via dividing wall ventilation holes 78, and protects gas supply control apparatus 118 (shown in FIG. 2) from heat produced by the burner.

Underneath support box segments 12 and 14 is an inclined surface 81 that is part of cooker body 10 and which forms the bottom of the first space 72. Surface 81 is inclined in order to permit grease accumulations to slide down into filter aperture 75 which is a rectangular opening in surface 81 sized to receive filter 26. Filter 26 is a baffle type impingement filter having two layers of overlapping baffles which prevent direct passage of flame or grease through the filter and force grease laden air to swirl and thus deposit grease on the inner surfaces of the baffles. Accumulation of grease on the baffles then drips down from the bottom of the filter. An example of such a filter is the "Thrifty Flame Stop" sold by Smith Filter Corporation.

Filter 26 is supported by filter support flanges 92 which are welded into the sides of grease tray housing 30. Filter lateral support guide flanges 94 also are welded into the sides of grease tray housing 30 and serve to position filter 26 directly into the filter aperture 75 by a restricting side-to-side movement. When in place, filter 26 slides up into filter aperture 75 as far as filter aperture flange 76 of inclined surface 81 so that smoke passing beneath support box segments 12 and 14 is required to exit through filter 26.

Filter grease tray 28 slides into grease tray housing 30 which forms the lower segment of cooker body 10. Filter grease tray 28 has side walls 100, end wall 102, and front wall 97 to which is attached grease tray handle 96. Filter positioning peg 98 projects from the inner surface of grease tray handle 96. When filter grease tray 28 has been thrust all the way into grease tray housing 30, filter positioning peg 98 forces filter 26 up and into filter aperture 75 and maintains a small space between grease tray handle 96 and filter 26 in order to prevent grease from dripping onto grease tray handle 96 and thus possibly out of the cooker. Filter grease tray 28 collects grease drippings from filter 26, which have either deposited on filter 26's baffles by the passage of smoke or rolled down from inclined surface 81 through the filter. Grease tray 28 and filter 26 may be easily removed and washed in a dishwasher.

When the barbecue cooker is assembled so that support box segments 12 and 14, greasepan 16, grill 18, valve and pilot light mechanism cover tray 20 are all positioned within cooker body 10, cooker cover 24 is placed over the open top of cooker body and is supported at its edges by cooker body 10's flanged rim 11. Cooker cover 24 has two openings, grill opening 104 which is larger and valve control opening 106 which is smaller. Divider 108 depends from the lower surface of cooker cover 24 and serves to separate apertures 104 and 106. When the cooker cover 24 is in place, it is spaced above the grill 18 so that smoke which is drawn into smoke passage 67 between support box segments 12 and 14 and cooker body 10 will not have an opportunity to exit through grill opening 104. Persons using the barbecue cooker can reach through grill aperture 104 to place meats and other foods such as vegetables, fish, and soup containers onto grill 18. The gas control handle (shown in FIG. 2) for regulating entry of gas into burner 22 may be reached through valve control opening 106.

FIG. 2 shows an enlarged side cross-sectional view of the assembly of the invention. Filter 26 is in place under filter aperture 75 supported by filter support flange 92 and laterally positioned by filter lateral support guide flange 94. Filter positioning peg 98 on grease tray handle 96 presses filter 26 up into place within filter aperture 75, so that filter 26 extends upwardly past filter aperture flange 76 and smoke must thus pass through filter 26 in order to exit the cooker. Filter grease tray 28 has been thrust completely into grease tray housing 30 so that filter grease tray front wall 97 abuts against grease tray housing 30.

Exhaust aperture coupling 110 is shown protruding to the right hand side of grease tray housing 30. This aperture is connected by ducting (not shown) to exhaust means, which create a vacuum in order to draw smoke through the filter 26 and into grease tray housing 30 and thence on out through the exhaust means to the outdoors. The exhaust means may be a chimney, or a duct equipped with a fan or any of standard means well known to the art. Above filter 26 may be seen inclined surface 81; grease that accumulates on that surface will drip or roll down it to the filter 26 and then through that filter to filter grease tray 28. Higher may be seen support rods 68, first and second support box segments 12 and 14, greasepan 16, grill 18, burner 22, cover tray 20, and cooker cover 24.

Cooker body 10 is supported within cooker housing 134, which is an open-topped sheet metal box containing ventilation holes 133 in its sides as well as other holes for the passage of gas lines, smoke exhaust lines, and the like. The cooker body 10 is spaced from the walls of cooker housing 134 on sides and bottom, to insulate the hot cooker from its surroundings. The cooker body 10 is supported by cooker housing 134, which, in turn, is supported by Table T engaging housing rim 135. The cooker projects slightly above the level of Table T and is not flush with it. This is for the sake of appearance and helps prevent food spillage into openings in the top of the cooker because plates, pots, pans and the like cannot be slid over the cooker from the table top. In addition, the projection of the cooker above the level of the table deflects lateral air currents away from grill opening 104 and thus helps prevent the interference of these air currents with the removal of smoke by the smoke removal system described earlier.

Filter grease tray 28 is removed by reaching under table T and lifting and pulling handle 96; then filter 26 may be removed. Filter grease tray 28 and filter 26, as well as greasepan 16 and grill 18, may be conveniently placed in a dishwasher for thorough cleansing. Portions of greasepan 16 have been cut away in FIG. 2 in order to reveal an inner surface of support box segments 12 and 14. Lateral inner flange 55 which is attached to the second support box segment 14 may be seen behind burner 22. In addition, grill support pegs 38 may be seen supporting grill 18 and through the cut-away portion of greasepan 16 may be seen greasepan support peg 50. First smoke flow direction arrows 138 demonstrate the direction taken by smoke as it exits from the portion of first space 72 that lies under support box segments 12 and 14, through filter 26 into grease tray housing 30, and then out through exhaust aperture coupling 110 in the direction of the exhaust means.

FIG. 2 also shows the pilot light and gas supply control apparatus mounted in the cooker. Gas supply control apparatus 118, of a type that is standard in the field, is supported within second space 74 of the cooker body by gas supply control apparatus support bracket 120. Gas supply line 122 enters cooker housing 134 through an aperture and enters space 74 from underneath to reach gas supply control apparatus 118. An example of an adequate gas supply control apparatus 118 is the Grayson Model 7000 MVRLC Combination Control which is both manually and electrically activated. Burner 22 is mounted in and supported by a gas supply nozzle 119 attached to gas supply control apparatus 118 and supported by nozzle bracket 121. Cooking gas enters the burner 22 via gas supply nozzle 119 inserted into burner gas line connector 40 from gas supply control apparatus 118 at a controlled rate. The supply of cooking gas into the burner is controlled by rotation of gas control handle 124 which rests atop cover tray top 88 and engages gas control valve stem 123, which in turn penetrates valve control apparture 86 in valve mechanism cover 20. Control of the gas supply by a handle on top of the cooker, rather than one off to the side or at some remove from the cooker, is acknowledged to be safer in operation as well as permitting individual customers or cooks to directly control the cooking of their food.

Associated with gas supply control apparatus 118 is pilot light apparatus 114 which is mounted on top of ledge 79 by pilot light apparatus support bracket 116. Gas from gas supply control apparatus 118 is supplied to pilot light apparatus 114 through pilot light line 115. The pilot light apparatus 114 is composed of a burner which projects a flame underneath the first set of burner air holes 44 in burner 22. An example of an adequate pilot light burner is the Jade Control Model J122L10-10-10AN. The pilot light apparatus is intended to produce the flame or pilot light continously even when the cooker is not in use. Accordingly, gas supply control apparatus 118 supplies gas to pilot light apparatus 114 even when gas control handle 124 has been rotated so as to shut off the flow of cooking gas into burner 22. (A separate, manual, valve in gas supply control apparatus 118 regulates flow of gas to the pilot light apparatus 114).

Part of pilot light 114 is a temperature sensing mechanism which is a thermocouple responsive to the heat of the pilot light which produces on electric signal in response thereto. An example of an adequate temperature sensing mechanism is the Jade Controls Model JHNR10. If the pilot light is extinguished for any reason the thermocouple detects the lack of heat from the pilot light and causes gas supply control apparatus 118 to shut off the flow of gas to the pilot light apparatus through pilot light line 115.

A further safety feature is provision of pressure safety switch 126, which is mounted in cooker housing 134 on one of its side walls. An example of an adequate pressure switch is Dwyer Instruments Model 1910-00. Cooker pressure sensor tube 130 runs from pressure safety switch 126 to the grease tray housing 30 part of cooker body 10, penetrating the wall of grease tray housing 30 by virtue of cooker pressure sensor tube inlet fixture 132. The pressure safety switch detects the difference in pressure between the inside of cooker body 10 and the outside thereof. When that difference in pressure falls below a predetermined minimum a signal is sent via pressure safety switch control lines 128 to gas supply control apparatus 118 which then causes the flow of gas into burner 22 to cease. The purpose of this is to turn off the flow of gas into burner 22 when the exhaust means is no longer drawing smoke from the cooker body, such as might occur if the fan in a ventilation chimney were to fail or such chimney were to become blocked. This cut-off feature prevents the cooker from operating when its smoke removal system is not working. Thus, smoke from cooking will not enter the ambient atmosphere of the restaurant or household due to a failure in the exhaust means.

The first preferred embodiment of the drawings shows the gas supply and pilot light mechanisms as being located on the end of the cooker body above the exhaust aperture coupling 110. They could just as easily be located at the end of the cooker body above the filter grease tray 28.

FIG. 3 is an enlarged end cross-sectional view of the assembly of the invention taken along line 3—3 of FIG. 2. This figure clearly shows the correct disposition of burner 22 within burner slot 31 between ramps 33. A space between the burner 22 and the upper edges of ramps 33 may be noted; this space provides for passage of air-gas mixture from gas holes 42 to provide for flames on either side of the burner. Burner cover 34 may be seen above burner 22, interposed between burner 22 and grill 18, upon which will be disposed the food articles to be cooked. Ventilation holes 58 in the end of second support box 14 are clearly seen; air passes through these holes into the support box segment assembly underneath greasepan 16, up into burner slot 31 to reach holes sets 46 and 44 in burner 22, for proper mixture of air with gas in burner 22, and also provide adequate combustion once the air-gas mixture leaves gas holes 42.

Second smoke flow direction arrows 140 demonstrate the paths taken by smoke from the grill 18 to and through filter 26. Smoke rises from grill 18 and grill pan 16 and is drawn off to the sides by the lower pressure in smoke passages 67 on either side of the support box segment assembly, thence down through the smoke passages 67 to that portion of space 72 which is under the support box segment assembly, thence through filter 26 into grease tray housing 30, and out through exhaust aperture coupling 110, toward the exhaust means which creates the vacuum which operates the smoke collection system. Grill opening 104 is clearly shown and permits users of the barbecue cooker to reach through cooker cover 24 to place food articles on grill 18 or remove them as the case may be.

FIG. 4 is an enlarged top plan view of part of the assembly of the invention with cooker cover 24 removed as well as portions of the grill 18 and greasepan 16, to show burner 22 supported at one end by the insertion of burner support flange 48 into burner support socket 52 of the second support box segment 14. The smoke passages 67 through which smoke is drawn down the sides of the support box segment assembly are clearly revealed. Cooker cover 24 has been removed.

Also shown is cover tray 20 with gas control handle 124 positioned thereon. Burner 22 is shown in silhouette with its component burner gas line connector 40 indicated thereon.

FIG. 5 illustrates a cross-section of a second preferred embodiment of the present invention. This cross-section corresponds to that of FIG. 2 for the first preferred embodiment, and illustrates the differences and similarities between the two preferred embodiments. The cooker housing 134 is not shown.

The second preferred embodiment shows the assembly of the invention adopted for employment of charcoal, coal and other combustible solids as the heat-providing means. In many countries, charcoal and the like are more available and less expensive than gas. In addition, charcoal may be desired for esthetic and flavoring reasons. A cooker adapted to cook with charcoal is also less expensive to make, because the greasepan and gas supply apparatus may be eliminated.

Turning to FIG. 5, one may note that the only differences between the second and first preferred embodiments are those necessitated by the elimination of gas heating and its replacement by charcoal combustion heating.

Thus, burner 22 is no longer needed, and the various apparatus for the supply and control of gas to the burner may be eliminated. Second space 74 need not be part of the volume defined by the cooker body 10, for the purpose of that space was to accommodate the gas supply and control apparatus. Dividing wall 70 becomes an end wall of the cooker body 10.

The greasepan support box assembly of the first preferred embodiment is modified into a one-piece coal box 142, held up by support rods 68. The coal box 142 is much the same as the greasepan support box assembly and has the same sets of ventilation holes 58 and 60 in the end wall which communicate with the same sets of ventilation holes 78 and 80 in cooker body 10 and permit air to enter the coal box. Smoke passages 67 (not shown) on either side of coal box 142 and the rest of the apparatus for gathering, filtering, and disposing of smoke is the same as in the first preferred embodiment.

A coal pan 144 rests within and is supported by coal box 142 in the same way that grease pan 16 rested within and was supported by the greasepan support box assembly. Coal pan 144 is a simple open-topped box having a flange 146 around its top containing handles 148 for ease of removal. Grill 18 rests within the opening of coal pan 144 and is supported by grill support pegs 38. Coal pan ventilation holes 152 are provided in end walls of the coal pan to allow air to enter from the coal box. Charcoal C is placed in a simple open-topped coal tray 154 which lies on the bottom of coal pan 144. (In some countries, charcoal may be purchased ready-packed in aluminum open-topped boxes identical to coal tray 154, in which case the cooker will be designed to fit these boxes or charcoal trays.) Coal tray 154 is sized so that it is smaller in length and width, horizontally, than the cavity of coal pan 144 in which it rests. This permits air to enter the coal pan 144 through ventilation holes 152 and pass upwards to the cover 24 and thence into smoke passages 67 (not shown). This ensures that the proper air flow pattern is set up to permit effective smoke removal. The charcoal C receives air for combustion from above the cooker.

To operate the cooker of the second preferred embodiment, a charcoal-filled coal tray is placed within the coal pan which is then ignited. The grill is then put in place above the charcoal. The coal pan is thereupon put into position in the cooker body. Cover 24 is then placed on top of cooker body 10 and the exhaust means is activated to begin drawing the smoke created by the combustion of charcoal.

The coal pan, grill, and coal box are all easily removed for thorough cleaning. Coal tray 154 may be discarded after use if it is of the light aluminum sort which is purchased with the charcoal.

Although preferred embodiments of the invention have been illustrated and described with reference to the accompanying drawings, those skilled in the art will understand that the preferred embodiments are by way of example. Various changes and modifications may be made, such as provision of electric heating coils in place of combustion of gas or charcoal, without departing from the spirit of the invention, the scope of which is intended to be defined by the appended claims.

What is claimed is:

1. A barbecue cooker comprising:
   a cooker body, said cooker body being hollow and having a pair of side walls, a pair of end walls, a bottom and a top, said top having an opening therein and said bottom having an opening therein;
   a grease tray housing attached to and underneath the cooker body, the grease tray housing being positioned so as to enclose the opening in the bottom of the cooker body;
   a removable grease pan support box having a pair of side walls, a pair of end walls and a grease pan support box top, said grease pan support box top having an opening, the grease pan support box being positioned within the cooker body underneath the opening in the top of the cooker body and spaced from the side walls of the cooker body so as to form passages between the grease pan support box and the cooker body for removal of smoke from the grease pan support box top down the passages to the opening in the bottom of the cooker body and thence into the grease tray housing;
   a removable rectangular grease pan having two pairs of walls and resting within and supported by the grease pan support box under the opening in the bottom of the cooker body;
   a removable grill positioned above the grease pand and supported by the grease pan so that drippings from the grill will fall into the grease pan;
   a burner comprising a hollow tube with two rows of gas holes parallel to the axis of the tube and on either side of a horizontal diameter of the tube, the burner being positioned within a slot defined in the grease pan and parallel to and spaced from two of the walls of the grease pan;
   a burner cover positioned parallel to and above the slot in the grease pan for shielding the burner and the slot from drippings from the grill, the width of the burner cover being not substantially greater than the width of the burner in order to shield the burner from drippings from the grill without substantially affecting the direction of the flames emerging from the burner;
   control valve means and fuel supply means operatively associated with said burner and positioned in a chamber formed in the cooker body isolated from the grill and the grease pan so as to prevent passage of smoke or flame into the chamber;

at least one end wall of the grease pan support box having at least one ventilation hole coincident with at least one ventilation hole in at least one end wall of the cooker body when the grease pan support box is in place in the cooker body, the ventilation holes in the cooker body and in the grease pan support box permitting passage of air from outside the cooker body into the grease pan support box, the end walls of the grease pan support box and of the cooker body that have ventilation holes being tightly fitted together so as to prevent entry of smoke from the passages between the grease pan support box and the cooker body into the ventilation holes in the end walls of the grease pan support box and of the cooker body and thus prevent escape of smoke from inside to outside of the cooker body via the ventilation holes in the end wall of the cooker body;

a filter removably positioned in or against the opening in the bottom of the cooker body, the filter being sized to cover the entirety of the opening in the bottom of the cooker body so that smoke passing from the cooker body into the grease tray housing must pass through the filter;

a removable filter grease tray formed as an open topped box and supported within the grease tray housing under the filter to catch grease accumulating on the filter or passing through the filter from above;

the bottom of the cooker body being sufficiently inclined from the horizontal so as to tend to cause grease accumulations on said bottom to slide down to and through the filter into the filter grease tray; and a duct formed in the grease tray housing to permit exit of smoke which has passed from the cooker body through the filter and over the filter grease tray.

2. The barbecue cooker according to claim 1 in which the grill defines a central slot passing therethrough aligned parallel to and above the burner cover when the grill is in place above the grease pan, to permit drippings to pass through the grill onto the burner cover.

3. The barbecue cooker according to claim 1 in which the filter is composed of overlapping baffles.

4. The barbecue cooker according to claim 1 further comprising a control knob associated with the control valve means positioned on the top of the barbecue cooker for control of fuel supply to the burner.

5. A barbecue cooker, comprising:
a cooker body, said cooker body forming a hollow compartment and having a pair of end walls, a pair of side walls, a bottom in which is formed a rectangular opening, and a top in which is formed an opening;

a grease tray housing attached to and underneath the cooker body, the grease tray housing being positioned so as to enclose the opening in the bottom of the cooker body;

a rectangular grease pan support box having a pair of side walls, a pair of end walls, and a grease pan support box top in which is formed a rectangular opening, said grease pan support box being detachably supported within the hollow compartment of the cooker body so that the rectangular opening in the grease pan support box top is underneath and substantially aligned with the rectangular opening in the top of the cooker body and the grease pan support box is positioned within the hollow compartment of the cooker body so that a passage is formed between at least one of the side walls of the grease pan support box and at least one of the side walls of the cooker body, to permit passage of smoke from the top of the grease pan support box to beneath the grease pan support box and thence through the opening in the bottom of the cooker body and into the grease tray housing;

at least one end wall of the grease pan support box having at least one ventilation hole formed therein that is coincident with at least one ventilation hole formed in at least one end wall of the cooker body when the grease pan support box is in place in the cooker body in order to permit passage of air from outside the cooker body into the grease pan support box, the end walls of the grease pan support box and of the cooker body that have ventilation holes being tightly fitted together so as to prevent entry of smoke from the passages between the grease pan support box and the cooker body into the ventilation holes in the end walls of the grease pan support box and of the cooker body and thus prevent escape of smoke from inside to outside of the cooker body by way of the ventilation holes in the end walls of the cooker body;

a rectangular grease pan having with two pairs of walls and at least one recess formed in the grease pan for collection of grease and holding of water or rocks, the rectangular grease pan being detachably supported by and within the grease pan support box so that the grease pan lies underneath and substantially aligned with the rectangular opening in the top of the cooker body and the rectangular opening in the grease pan support box;

a rectangular grill supported by the grease pan under the rectangular opening in the top of the cooker body and above the grease pan so that drippings from the grill will fall into the grease pan and so that the grill is substantially aligned with the rectangular openings in the top of the cooker body and of the grease pan support box;

heating means positioned beneath the grill within the grease pan;

a rectangular grease filter removably held in or against the opening in the bottom of the cooker body by support means adjacent to the bottom of the cooker body, the grease filter being sized to cover the entirety of the opening in the bottom of the cooker body so that smoke passing from the cooker body into the grease tray housing must pass through the grease filter so that grease is removed from the smoke;

a filter grease tray detachably supported within the grease tray housing under the grease filter to catch grease accumulating on the grease filter or passing through the grease filter from above;

the bottom of the cooker body being sufficiently inclined from the horizontal so as to tend to cause grease accumulations on said bottom to slide down to and through the grease filter into the filter grease tray; and a duct formed in the grease tray housing to permit exit of smoke which has passed from the cooker body through the filter and over the filter grease tray.

6. The barbecue cooker according to claim 5 in which the heating means comprise a burner tube which burns a mixture of combustible gas and air, said burner tube being positioned within a slot defined in the grease pan and below the grill, said burner tube and said slot further being positioned parallel to and spaced from the side walls of the grease pan support box.

7. The barbecue cooker according to claim 6, further comprising control valve means and fuel supply means operatively associated with said burner tube.

8. The barbecue cooker according to claim 7 in which the control valve means and the fuel supply means are positioned in a separate chamber of the cooker body isolated from the grill and grease pan so as to prevent passage of smoke or flame thereinto.

9. The barbecue cooker according to claim 5 in which the filter grease tray is formed as an open topped box located under the grease filter.

10. The barbecue cooker according to claim 6 in which the burner tube comprises a hollow tube with two rows of gas holes, to permit exit of gas, said rows of gas holes being parallel to the axis of the tube and on either side of a horizonal diameter of the burner tube.

11. The barbecue cooker according to claim 6 further comprising a burner cover positioned parallel to and above the slot in the grease pan, for shielding the burner tube and the slot from drippings from the grill.

12. The barbecue cooker according to claim 11 in which the width of the burner cover is not substantially greater than the width of the burner in order to shield the burner tube from drippings from the grill without substantially affecting the direction taken by flames emerging from the burner.

13. A barbecue cooker, comprising:
a cooker body, said cooker body forming a hollow compartment and having a pair of end walls, a pair of side walls, a bottom in which is formed a rectangular opening, and a top in which is formed a rectangular opening;
a grease tray housing attached to and underneath the cooker body, the grease tray housing being positioned so as to enclose the opening in the bottom of the cooker body;
a rectangular coal box for holding a coal pan for containing combustible solids such as charcoal, said coal box comprising a pair of side walls, a pair of end walls, and a coal box top in which is formed a rectangular opening, said coal box being detachably supported within the hollow compartment of the cooker body so that the rectangular opening in the coal box top is underneath and substantially aligned with the rectangular opening in the top of the cooker body, and the coal box is positioned within the hollow compartment of the cooker body so that two passages are formed on each side of the coal box between the side walls of the cooker body and the side walls of the coal box, to permit passage of smoke from the coal box top to beneath the coal box and into the opening in the bottom of the cooker body and thence into the grease tray housing;
a rectangular grill positioned within the cooker body, under the rectangular opening in the top of the cooker body, and supported by the coal pan located within the coal box so that drippings from the grill will fall into the coal pan;
at least one end wall of the coal box having at least one ventilation hole formed therein that is coincident with at least one ventilation hole formed in at least one end wall of the cooker body, when the coal box is in place in the cooker body, in order to permit passage of air into the coal box from outside the cooker body, the end walls of the coal box and the end walls of the cooker body that have ventilation holes being tightly fitted together so as to prevent entry of smoke into the ventilation holes in the coal box and in the cooker body from the passages between the grease pan support box and the cooker body and thus to prevent escape of smoke to the outside of the cooker body via the ventilation holes in the cooker body;
a grease filter removably supported against or in the opening in the bottom of the cooker body, the grease filter being sized to cover the entirety of the opening in the bottom of the cooker body so that smoke passing from the cooker body into the grease tray housing must pass through the grease filter;
a filter grease tray formed as an open topped box and detachably supported within the grease tray housing under the grease filter to catch grease accumulating on the grease filter or passing through the grease filter from above;
the bottom of the cooker body being sufficiently inclined from the horizontal so as to tend to cause grease accumulations on said bottom to slide down to and through the grease filter into the filter grease tray; and
a duct formed in the grease tray housing to permit exit of smoke which has passed from the cooker body through the grease filter and over the filter grease tray.

14. The barbecue cooker according to claim 13 further comprising a coal pan detachably supported by the coal box, said coal pan being adopted to receive charcoal and the like for burning in order to cook food items placed on the grill.

* * * * *